United States Patent [19]

Eachus

[11] 4,092,492
[45] May 30, 1978

[54] CLOCKLESS SERIAL DATA TRANSFER

[75] Inventor: Joseph J. Eachus, Cambridge, Mass.

[73] Assignee: Honeywell Information Systems Inc., Waltham, Mass.

[21] Appl. No.: 744,832

[22] Filed: Nov. 24, 1976

[51] Int. Cl.² .............................................. H04L 25/30
[52] U.S. Cl. .................................. 178/68; 340/167 R
[58] Field of Search .................. 178/67, 68; 325/30, 325/38 A; 340/147 R, 147 G, 147 MD, 167 R, 169, 186, 187, 203

[56] References Cited
U.S. PATENT DOCUMENTS

| | | | |
|---|---|---|---|
| 3,732,495 | 5/1973 | McRae et al. | 340/203 |
| 3,806,904 | 4/1974 | Weinberger et al. | 340/186 |
| 3,816,657 | 6/1974 | Fletcher | 178/67 |

Primary Examiner—Benedict V. Safourek
Attorney, Agent, or Firm—Ronald T. Reiling; Nicholas Prasinos; William F. White

[57] ABSTRACT

Method and apparatus are disclosed for the serial transfer of data in a clockless manner. Data is transmitted in the form of signal state changes from a dispatcher to a receptor. The receptor is operative to translate the signal state changes into data and thereafter signal the data dispatcher that it has done so. The dispatcher is operative to transmit the next piece of data only after it has been appropriately signalled by the receptor.

In accordance with another aspect of the invention, the dispatcher is capable of notifying the receptor when an end to the transmittal of data has occurred. The data receptor does not signal the dispatcher for further data when this occurs. The receptor instead signals a data sink that the previously transmitted data is available for copying. The data sink copies the data and thereafter authorizes the receptor to initiate further data receiving operations.

30 Claims, 8 Drawing Figures

CLOCKLESS SERIAL DATA TRANSFER

BACKGROUND OF THE INVENTION

1. Field of the Invention

This invention relates generally to the transfer of data in a serial manner. In particular, this invention relates to the transfer of data between a dispatcher and a receptor in such a manner as to be completely independent of any clocking scheme.

2. Description of the Prior Art

Both method and apparatus for the serial transfer of data in a rate independent fashion have been disclosed in U.S. application Ser. No. 534,972 entitled "Rate Independent Signalling Means", filed on Dec. 20, 1974 by Joseph J. Eachus now U.S. Pat. No. 4,002,833. This particular application disclosed a manner of transmitting information from a dispatcher to a receptor without benefit of a specified rate of data transmittal. This was accomplished by coding signal transitions between four signal states that were being transmitted between the data dispatcher and the data receptor.

The transitions between the four signal states occur by way of signal state changes to two bi-level signals generated by the data dispatcher. The data dispatcher is operative to change the signal state of either or both bi-level signals depending on which of three discrete units of information is to be thereby encoded. In the preferred embodiment, a change in signal state of only one bi-level signal is indicative of a data binary one whereas a change in signal state of the other bi-level signal is indicative of a data binary zero. A simultaneous change in signal state of both bi-level signals indicates an end of data.

The above encoding of data was achieved by internal logic within the data dispatcher which was capable of timely executing the various signal transitions. In this regard, the internal logic is premised on a clocking signal which provides the requisite timing necessary to produce the variously occurring signal transitions. This internal clocking within the data dispatcher is preferably at a given rate even though such rate need not be known to the data receptor.

It is therefore to be appreciated that the aforementioned system is not completely clockless insofar as the encoding of the data by the data dispatcher. It is furthermore to be appreciated that the receptor must be capable of receiving the data at the rate of transmittal dictated by the dispatcher. In this regard, there is no assurance that the data receptor will be capable of receiving the data at the rate in which it is being transmitted by the dispatcher. Such a system allows for the possibility of a rate of transmittal by the dispatcher which will be high enough to override the response characteristics of the receptor. Such a rate of transmittal would of course result in a loss of data by the receptor.

OBJECTS OF THE INVENTION

It is an object of the present invention to provide improved method and apparatus for transferring data in a manner which is completely independent of any clocking.

It is another object of the invention to provide method and apparatus for transmitting data in a manner which prohibits override of the response characteristics of the receptor.

It is still another object of the invention to provide a communications system wherein a receptor of data exercises a degree of control over the transmittal of data by a dispatcher.

It is still another object of the invention to provide a data sink which exercises a degree of control over the receptor.

It is still a further object of the invention to provide a communications system having a clockless serial data transfer between a data dispatcher and a data receptor wherein the dispatcher's ability to transmit data is controlled by both the data receptor and the data sink.

SUMMARY OF THE INVENTION

The above objects are achieved according to the present invention by providing a communications system wherein data is serially transmitted by a dispatcher and thereafter received by a receptor in a completely clockless manner. A predetermined amount of data, defined by a data source, is initially loaded into the data dispatcher. The data dispatcher is operative to encode the data as changes among four discrete signal states. In the preferred embodiment, these four signal states are defined to be the signal states of two bi-level signals.

The dispatcher transmits an encoded unit of data only when authorized to do so by the receptor. Authorization occurs in the form of one or more changes among four signal states that are fed back to the dispatcher from the receptor. In the preferred embodiment, these four signal states are defined to be the signal states of two bi-level signals.

The receptor is itself subject to the control of a data sink. The data sink may suspend the receptor's authorizations to the dispatcher. This effectively terminates further transmittal of data from the dispatcher which is premised on an appropriate authorization by the receptor. Such occurs automatically following an end of data transmittal by the dispatcher. The next sequential transfer of data occurs only upon reactivation of the receptor by the data sink.

DESCRIPTION OF THE PREFERRED EMBODIMENT

Figure 1:
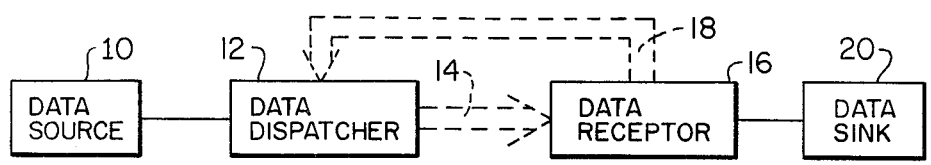
FIG. 1 is an overall block diagram of a clockless data transfer system employing the invention.

Referring to FIG. 1, a data source is connected to a data dispatcher 12 which transmits data via a communications link 14 to a data receptor 16. The data which is provided to the data receptor 16 via the communications link 14 consists of the encoded signal transitions among four signal states. The communications link can consist of for example a multiplex communication system having a modulated wave transmission or a simple pair of parallel wires which transmit DC signal levels.

In the latter case, a pair of bi-level signals on two separate lines would suffice as an appropriate communications link having four separate signal states with ability to encode signal transitions therebetween.

In accordance with the present invention, the data receptor 16 feeds back information to the data dispatcher 12 via a communications link 18. As will be more fully described hereinafter, the communications link is operative to transmit changes in signal state from among four signal states to the data dispatcher 12. The changes in signal state occur as the result of the data receptor 16 having received the encoded changes of signal state from the data dispatcher 12 over the communications link 14. It is to be noted that the communications link 18 can consist of a multiplex communication system having a modulated wave transmission or a simple pair of parallel wires for transmitting DC signal levels. In the latter case, the pair of parallel wires would each transmit a bi-level signal with two signal states so as to thereby provide the requisite four signal states.

The data receptor 16 is also connected to a data sink 20. The data sink 20 represents any of a number of data processing elements capable of receiving and storing bits of information. For instance, the data sink 20 could comprise a storage device having appropriate storage capacity for receiving the information that is likely to be transmitted from the data source 10.

The preferred embodiment requires that the data source 10 provide "n" bits of information at a time to the data dispatcher 12. This is accomplished at such time as the data dispatcher 12 is not otherwise busy. The quantity denoted by "n" can vary and is separately indicated to the data dispatcher 12. The data source represents any of a number of data processing elements. For instance, the data source could be a central processor having a limited storage capacity.

Figure 2:
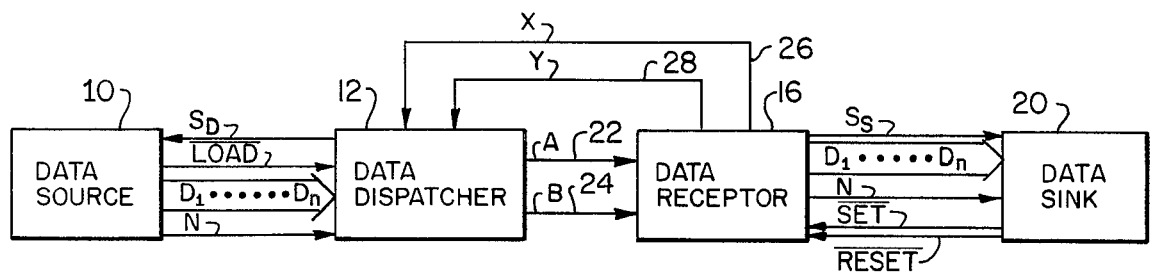
FIG. 2 is a block diagram of a particular implementation of the system of FIG. 1.

Referring to FIG. 2, the data dispatcher 12 and the data receptor 16 are again illustrated with the respective communication links 14 and 18 being replaced with pairs of parallel wires. Specifically, the forward communications link 14 of FIG. 1 has been replaced with a pair of wires 22 and 24 whereas the feedback communications link 18 has been replaced by a pair of parallel wires 26 and 28. The data dispatcher 12 is operative to produce bi-level signals A and B which are transmitted to the data receptor 16 via the lines 22 and 24. The data receptor 16 is operative to generate bi-level signals X and Y which are fed back to the data dispatcher 12 via the lines 26 and 28.

The data dispatcher 12 and the data receptor 16 are furthermore subject to certain signals emanating from the data source 10 and the data sink 20. As will become apparent hereinafter, the data source and data sink through these signals exercise a degree of control over the dispatcher 12 and the data receptor 16.

The data source 10 delivers a $\overline{\text{LOAD}}$ signal as well as "n" data bits denoted as $D_1 \ldots D_n$ to the dispatcher 12. A signal N indicative of the numerical count of data bits is also provided to the data dispatcher 12 by the data source 10. The data bits $D_1 \ldots D_n$ and the numerical count thereof are loaded into an internal register and counter within the data dispatcher 12 at such time as the data dispatcher is not otherwise busy. The busy or not busy status of the data dispatcher 12 is indicated by an internally generated status signal $S_D$ which is transmitted to the data sink 10 as shown. The status signal $S_D$ will be in the zero state or logically low when not busy. At such time as the status signal $S_D$ is in this zero state, the data source 10 is permitted to lower the signal state of the $\overline{\text{LOAD}}$ signal. The $\overline{\text{LOAD}}$ signal will actually be set low when the data source 10 wishes to load the "n" bits of data and the numerical count thereof into the dispatcher. The data source 10 will maintain the $\overline{\text{LOAD}}$ signal in the logically low signal state until such time as it wishes to change the status of the dispatcher 12 from "not busy" to "busy". At this time, the $\overline{\text{LOAD}}$ signal will be switched logically high which will in turn set the status signal $S_D$ logically high within the data dispatcher 12. The data source 10 will thereafter continue to maintain the $\overline{\text{LOAD}}$ signal in its logically high signal state until at least such time as it receives the next "not busy" indication from the dispatcher. To summarize the above, the following conditions will occur at the data dispatcher 12 prior to transmittal:

$S_D = 1$
$\overline{\text{LOAD}} = 1$
$D_1 \ldots D_n$ will be internally loaded into a register.
Numerical count of "n" will be internally loaded into a counter.

It is to be noted that the above numerical count of "n" can denote any number of meaningful groupings of bits. For example, the numerical count may be used to denote a character consisting of "n" bits. In this regard, the data source 10 groups the bits into a character which is to be loaded and thereafter transmitted as an entity.

In order for the data dispatcher 12 to subsequently transmit the data bits $D_1 \ldots D_n$ to the data receptor, it is necessary that certain conditions be present at the data receptor. Specifically, any previously transmitted data bits $D_1 \ldots D_n$ must have been noted or copied by the data sink 20. An internal counter within the receptor must have also been set equal to a minus one count. This latter event will have occurred at such time as the data sink 20 provides a $\overline{\text{SET}}$ signal equal to one. The receptor will also internally generate a logically high status signal $S_R$ in response to the $\overline{\text{SET}}$ signal being equal to one. The signals which are thus present at the data receptor are:

$S_R = 1$
$\overline{\text{SET}} = 1$
Internal counter is set at a minus one count.

The final set of signal conditions which must occur before a communication operation can begin between the data dispatcher 12 and the data receptor 16 is that the bi-level signals X and Y must logically agree with the bi-level signals A and B. This will occur only at such time as the data receptor 16 has been set by the $\overline{\text{SET}}$ signal from the data sink 20. In this manner, the data sink controls the entire transmission of data between the dispatcher and receptor.

With the bi-level signals in agreement following a $\overline{\text{SET}}$ signal from the sink, the data dispatcher 12 is now able to encode the data which it has previously received from the data source 10. Briefly stated, the encoding action of the data dispatcher 12 is to determine the binary value of each data bit and to thereafter appropriately reverse the signal condition of one of the two bi-level signals A and B. For example, if the binary value of a particular bit is zero, then the data dispatcher 12 is operative to reverse the bi-level signal A. If on the other hand, the binary value of the particular bit to be transmitted is a one, then the signal condition of the bi-level signal B is reversed. In either case, the data dispatcher 12 is operative to await confirmation from the data receptor 16 that the particularly encoded data bit has been appropriately received by the data receptor 16. This latter confirmation will occur via a change in either the bi-level signal X or the bi-level signal Y which is fed back to the data dispatcher 12 via the lines 26 and 28. In this regard, if for instance, a binary zero has been transmitted over the line 22, the data receptor 16 will upon receipt thereof subsequently store the binary zero in an internal register and duly note the count of data bits which has thus been received. The data receptor 16 will thereafter change the signal state of the bi-level signal X and feed the same back to the data dispatcher 12 via the line 26. It is to be appreciated that a similar data receipt and acknowledgement operation would occur if the binary value transmitted by the data dispatcher 12 via the line 24 was equal to a one. In this latter instance, the data receptor 16 would store the data one bit, increment the count of data thus received and thereafter change the bi-level signal Y.

The above communications operation of transmittal and confirmation continues to occur until "n" data bits have been transmitted, received and confirmed. At this time, the data dispatcher 12 reverses the signal states of both the bi-level signals A and B. This signals an "end of data" to the data receptor 16.

The data dispatcher also internally sets its status signal $S_D$ logically low at this time thereby signalling to the data source 10 that it is now ready to receive the next loading of "n" data bits. As will be remembered, the next loading will occur at such time as the $\overline{LOAD}$ signal from the data source 10 goes logically low. In this regard, the data source may already be awaiting an opportunity to set the $\overline{LOAD}$ signal logically low so as to load the next "n" bits of data.

The data receptor 16 receives the "end of data" notation from the data dispatcher 12 and thereafter increments the internal count of data thus received. In this regard, the data receptor 16 now contains the count of "n" since the original count within the data receptor was set equal to minus one and the count has been incremented "n+1" times inclusive of the increment occurring upon receipt of the "end of data" notation.

The data receptor 16 is now operative to change its status signal $S_R$ to a zero signal state or logically low. This serves as an indication to the data sink 20 that data is available for copying. The data consists of the data bits $D_1 \ldots D_n$ as well as the count N of data bits. The data sink may either copy the data immediately or it may merely note that data is available for copying. In either event, the data receptor will not be released for further communication with the dispatcher until a logically high $\overline{SET}$ signal is received from the data sink 10. In this regard, the bi-level signals X and Y from the receptor will remain in disagreement with the bi-level signals A and B from the dispatcher. This is attributable to internal logic within the data receptor 16 which allows the same to suspend its acknowledgement of receipt of the "end of data" notation until it has received the $\overline{SET}$ signal from the data sink 20. The locked condition which will thus occur is as follows:

$\overline{SET} = 0$ signifying that the data sink has not released the data receptor.
$S_R = 0$ signifying that the receptor awaits further action by the data sink.

A ≠ X⎫
     ⎬ This indicates to the data dispatcher 12 that the data receptor has not yet been released.
B ≠ Y⎭

The above locked condition will continue until such time as the data sink releases the data receptor 16 by a logically high $\overline{SET}$ signal. At this time, the data sink will have copied the "n" data bits and noted the numerical count thereof. The count within the receptor will subsequently be set to a minus one count by internal logic responsive to the $\overline{SET}$ signal. The status signal $S_R$ will also be internally set equal to one in response to the $\overline{SET}$ signal. With the above set of signal conditions present at the receptor, the data dispatcher 12 will now be free to transmit further data. As has been previously noted, the data dispatcher 12 will do so at such time as it has received further data from the data source 10. Assuming that the same has occurred after the data dispatcher transmitted an "end of data" notation, the following signal conditions will be present at the data dispatcher:

$S_D = 1$
$\overline{LOAD} = 1$
$D_1 \ldots D_n$ will be internally loaded into a register.
Numerical count of "n" will be internally loaded into a counter.

The above set of signal conditions at the dispatcher will combine with the set of signal conditions at the receptor so as to permit the transmittal of the newly stored bits $D_1 \ldots D_n$.

It is also to be noted that a $\overline{RESET}$ signal is generated by the data sink 20. This signal overrides the normal operation of the data receptor by creating a locked condition which in turn suspends further communication of data. This signal will be discussed in detail hereinafter.

Having now described the overall transmittal of data between the data dispatcher 12 and the data receptor 16, it is now appropriate to turn to a detailed description of these individual elements. In this regard, the data dispatcher 12 is illustrated in further detail in FIG. 3. It will be remembered that the data dispatcher 12 receives a number of data bits from the data source 10 as well as the numerical count "n" thereof. The numerical count "n" is applied to a counter 30 whereas the data bits are applied to a shift register 32 in FIG. 3. The loading of the counter 30 and the shift register 32 is conditioned upon the data dispatcher 12 not being otherwise busy. The busy or not busy condition of the data dispatcher 12 is indicated by the status signal $S_D$ generated by a status network 34. The status signal $S_D$ is equal to zero when the dispatcher is not busy and is set equal to one when the data dispatcher 12 is loaded with the "n" data bits to be transmitted. It will be remembered that the data source 10 refrains from loading any further data as long as the status signal $S_D$ is equal to one.

As the data dispatcher 12 transmits data, the counter 30 changes count and the shift register 32 incrementally shifts the previously loaded data bits to the right. The counter 30 produces a count signal C having the value of zero when the contents of the counter are not yet zero and having the value of one thereafter. The register 32 is operative to produce a signal $R_O$ which indicates the binary value of the bit occupying the rightmost position within the shift register 32. In this regard, the rightmost data bit is always the earliest loaded bit from among those remaining in the shift register. The output signal $R_O$ from the register 32 is applied to an encoding circuit 36. The data encoding circuit is operative to change the signal states of either of its two output signals depending on the binary value of the signal $R_O$. These output signals constitute the bi-level output signals A and B of the data dispatcher 12. In this regard, the encoding circuit 36 is operative to change the signal state of the bi-level signal A when the signal $R_O$ indicates a binary value of one. On the other hand, the data encoding circuit 36 is operative to change the signal state of the bi-level signal B if the binary value indicated by the signal $R_O$ is zero. The data encoding circuit 36 is also operative to change the signal states of both the bi-level signals A and B when "n" bits of data have been successfully encoded and transmitted over the lines 22 and 24 to the data receptor 16.

It is to be noted that the data encoding circuit 36 is only operative to make the aforementioned signal changes when appropriately enabled by a GO signal G from a timing circuit 38. A logically high GO signal G is produced by the timing circuit 38 in response to a confirmation from the data receptor 16 that the previously transmitted bit of information has been received. It will be remembered that receipt of a bit of information is confirmed by the data receptor 16 changing the signal state of either of the bi-level signals X and Y. In this regard, the bi-level signal X will have changed signal state if a binary one bit has been transmitted by the dispatcher 12 and received by the data receptor 16. On the other hand, the bi-level signal Y will have changed signal state if a binary zero has been transmitted by the dispatcher 12 and received by the data receptor 16.

A logically high GO signal G is also produced by the timing circuit 38 in response to an unlocking of the data receptor 16 by the data sink 20. In this regard, both bi-level signals X and Y will have changed signal state when the data receptor 16 receives a $\overline{SET}$ signal from the data sink 20.

The aforementioned changes in signal state of the bi-level signals X and Y are noted within the timing circuit 38 by comparing these signals with the negations of the bi-level signals A and B which are applied thereto via a pair of lines 40 and 42. In this regard, the state of the signal $\overline{A}$ is compared with the state of the signal X by an EXCLUSIVE OR gate 44. On the other hand, the state of the signal Y is compared with the state of the signal $\overline{B}$ by an EXCLUSIVE OR gate 46. The EXCLUSIVE OR gates 44 and 46 are operative to produce logically high output signals when the signal states of the respective signals applied thereto are not equal. In other words, the output of the EXCLUSIVE OR gate 44 will be logically high when $\overline{A} \neq X$. On the other hand, the output of the EXCLUSIVE OR gate 46 will be logically high when $\overline{B} \neq Y$. Stated another way, the output of the EXCLUSIVE OR gate 44 will be logically high when the signal state of A equals the signal state of X. The output of the EXCLUSIVE OR gate 46 will be logically high when the signal state of B equals the signal state of Y. In other words, the signal states of the output signals A and B from the data dispatcher 12 must be in agreement with the output signal states of the data receptor 16 as the same are received by the timing circuit 38 in order for both the EXCLUSIVE OR gates 44 and 46 to be logically high. This logically high signal conditions together with the status signal $S_D$ from the status circuit 36 are applied to a NAND gate 48. The NAND gate 48 will be logically low only when the three input signal conditions thereto are all logically high. This set of input conditions will occur only when the status signal $S_D$ is high and the output signals A and B of the data dispatcher 12 are in agreement with the output signals X and Y of the data receptor 16. This low signal condition occurring at the output of the NAND gate 48 under these circumstances is inverted through an inverter 50 so as to produce a logically high GO signal G on a line 52. The logically high condition of the GO signal G will be sustained until such time as either or both of the signal states of the output signals A and B from the data dispatcher 12 no longer agree with the output signals X and Y from the data receptor 16 or when the status signal $S_D$ itself goes low.

It is to be noted that a negation of the GO signal G is also generated by the timing circuit 38. This signal occurs at the output of the NAND gate 48 and is indicated as a signal $\overline{G}$ occurring on a line 54. The negation signal $\overline{G}$ will be logically high only when either or both of the signal states of the output signals A and B from the data dispatcher 12 do not agree with the signals X and Y received from the data receptor 16 or when the status signal $S_D$ itself goes low. The signals A and B are either jointly or separately in disagreement with the signals X and Y when a unit of information has been initially transmitted by the data dispatcher 12. The signal $\overline{G}$ will go high at this time. This low to high signal transition of the signal $\overline{G}$ is operative to both shift the shift register 32 and change the count of the counter 30. This is accomplished by directly applying the signal $\overline{G}$ to the counter 30 via a line 56. The shifting of the shift register 32 is accomplished by first applying the signal $\overline{G}$ to a NAND gate 58 which also receives the $\overline{LOAD}$ signal via a line 60. The $\overline{LOAD}$ signal originates at a terminal 62 and is logically high when loading is not taking place from the data source 10. With the $\overline{LOAD}$ signal logically high, the NAND gate 58 is operative to go logically high at such time as the signal $\overline{G}$ goes logically high. This signal transition from low to high at the output of the NAND gate 58 is operative to shift the shift register 32. The manner in which this is accomplished within the shift register 32 will be described in detail hereinafter.

To summarize the above, the counter 30 changes count and the shift register 32 is shifted in response to a low to high signal transition of the signal $\overline{G}$. This change in the count of the counter 30 and shift of the bit contents of the shift register 32 allows the data encoding circuit 36 to receive the next unit of information to be encoded.

The units of information which are to be encoded by the data encoding circuit 36 consist of either a binary one bit, a binary zero bit, or an end of data notation. The indication as to an end of data is received via a line 64 carrying the signal $\overline{C}$ from the counter 30. The signal $\overline{C}$ represents the negation of the count signal C and is logically high when the count within the counter 30 has not yet reached zero and is logically low thereafter. The bit value of either one or zero is received from the shift register 32 via a pair of lines 66 and 68. A signal $R_O$ occurring on the line 66 represents the assertion of the rightmost bit in the shift register 32. The signal $R_0$ occurring on the line 68 represents the negation of the rightmost bit. The signals $R_O$ and $\overline{C}$ are applied to a NOR gate 70 within the data encoding circuit 36. The signals $\overline{R}$ and $\overline{C}$ are applied to a NOR gate 72 within the data encoding circuit 36. The outputs of the NOR gates 70 and 72 are applied to a pair of NAND gates 74 and 76. The NAND gates 74 and 76 also receive the GO signal G via the line 52. The NAND gates 74 and 76 are operative to change signal state in response to a signal transition in the GO signal G. The transition of the GO signal G occurs after the NAND gates 74 and 76 have otherwise been conditioned by the outputs of the NOR gates 70 and 72. The NAND gates 74 and 76 thereby selectively trigger a pair of toggle flip-flops 78 and 80 in response to the outputs of the NOR gates 70 and 72. The flip-flops 78 and 80 in turn produce the bi-level output signals A and B which constitute the outputs of the data dispatcher 12.

The operation of the data encoding circuit 36 for the encoding of a binary one unit of information will now be described. The binary one unit of information will have been previously shifted into the rightmost bit position within the shift register 32. With the rightmost bit having a value equal to binary one, the signal $R_0$ will be logically high whereas the signal $\overline{R}_0$ will be logically low. It is to be appreciated that the signal $\overline{C}$ will be logically high as long as a data bit remains in the shift register 32. In this regard, the logically high signal level of the signal $\overline{C}$ enables the NOR gates 70 and 72 so as to respond to the signals $R_0$ and $\overline{R}_0$. These signals will cause the NOR gate 70 to switch logically low while maintaining the NOR gate 72 logically high. The logically high condition of the NOR gate 72 will cause the NAND gate 76 to go logically low upon the occurrence of the GO signal G on the line 52. The high to low signal transition of the NAND gate 76 will toggle the flip-flop 80 whereby changing the signal state of the bi-level signal A. In this manner, the bi-level signal A will change signal state indicating a binary one unit of information to the data receptor 16.

It is to be appreciated that a similar encoding operation would occur for a binary zero bit of information occupying the rightmost bit position within the shift register 32. In this regard, the $\overline{R}_0$ signal would be logically high so as to set the NOR gate 72 logically low. The NOR gate 70 would remain logically high in response to the $R_0$ signal being logically low. This would in turn cause the NAND gate 74 to switch from a logically high state to a logically low state upon receipt of a logically high signal condition from the GO signal G via the line 52. This high to low signal transition at the output of the NAND gate 74 will toggle the flip-flop 78 thereby changing the signal state of the bi-level signal B. In this manner, the bi-level signal B will change signal state indicating a binary zero unit of information to the data receptor 16.

The above encodings of particular bits of information occupying the rightmost bit position within the shift register 32 will continue to occur until such time as "$n$" bits of data have been encoded and transmitted. At this time, the count within the counter 30 will reach zero thereby causing the signal $\overline{C}$ to go logically low. This in turn will cause both the NOR gates 70 and 72 to go high. The logically high conditions of the NOR gates 70 and 72 will cause both NAND gates 74 and 76 to switch low upon the occurrence of a logically high signal condition in the GO signal G. The switching of both NAND gates 74 and 76 will toggle the respective flip-flops 78 and 80 thereby causing both bi-level signals A and B to change signal state. With a change in signal state of both the bi-level signals A and B, an end of data will be indicated to the receptor 16.

It is to be appreciated that the above data encoding and transmittal operations are premised upon, among other things, the data dispatcher 12 having been appropriately enabled by the data source 10. This occurs in the form of a change in the $\overline{LOAD}$ signal which is applied to the status circuit 34 of the dispatcher. As will be explained in detail hereinafter, the status circuit 34 is operative to produce a logically high status signal $S_D$ in response to the aforementioned authorization. The status circuit is moreover operative to produce a logically low status signal at such time as the data dispatcher has successfully encoded and transmitted all data. These signal states of the status signal reflect the busy or not busy conditions of the dispatcher as the case may be.

The status circuit 34 includes a NAND gate 82 which receives the GO signal G via a line 84 and the count signal C via a line 86. The output of the NAND gate 82 serves as an input to the NAND gate 88 which also receives the $\overline{LOAD}$ signal appearing at the terminal 62. The output of the NAND gate 88 is inverted through an inverter 90 and applied to a toggle flip-flop 92. The output of the flip-flop 92 constitutes the status signal $S_D$.

The operation of the above status circuit in response to being enabled by the data source 10 will first be discussed. In this regard, the GO signal G appearing on the line 84 and applied to the NAND gate 82 will be logically low prior to any such enablement. This will set the NAND gate 82 logically high which will in turn make NAND gate 88 responsive to the $\overline{LOAD}$ signal. The $\overline{LOAD}$ signal will switch logically high at such time as the data source 10 wishes to enable the data dispatcher 12. When the $\overline{LOAD}$ signal transition occurs, the output of the NAND gate 88 switches logically low. This output signal transition is inverted through the inverter 90 so as to cause a low to high signal transition at the input of the toggle flip-flop 92. The flip-flop 92 produces a logically high status signal $S_D$ in response to this low to high signal transition at its input. The status signal $S_D$ will remain logically high until such time as the toggle flip-flop 92 experiences another low to high signal transition.

The logically high status signal $S_D$ will enable the timing circuit 38 to respond to the signals A, B, X and Y. In this regard, the timing circuit will first respond to the signal conditions of A=X and B=Y. This will of course occur after the data receptor 16 has been unlocked by the data sink 20. This may or may not have already occurred by the time the data dispatcher is enabled by the data source.

In any event, the timing circuit 38 will thereafter be operative to alternately generate a logically high or logically low GO signal G as units of information are encoded and transmitted by the data dispatcher 12. The alternating level of the signal G will not effect the logically high output of the NAND gate 82 as long as the count signal C remains logically low. The count signal C will remain logically low until such time as the "$nth$" bit of data has been encoded and initially transmitted by the dispatcher 12. At this time, the count C will go logically high. The GO signal G will subsequently go logically high when the "$nth$" bit of data has been received by the receptor 16 and a receipt acknowledgement has been transmitted back to the timing circuit 38 via the lines 26 and 28. This will present a set of logically high input conditions to the NAND gate 82 causing the output thereof to switch logically low. This will in turn cause the output of the NAND gate 88 to switch logically high. The signal transition from low to high at the output of the NAND gate 88 is inverted to a high to low signal transition at the output of the inverter 90. This signal transition from high to low does not toggle the flip-flop 92 which is set to toggle on a low to high signal transition. Such a signal transition will occur when the following now takes place. The timing circuit 38 produces a logically low GO signal after the end of data is initially transmitted. The thus occurring logically low GO signal will cause the NAND gate 82 to switch logically high. The logically high output from the NAND gate 82 will combine with the logically high $\overline{\text{LOAD}}$ signal to cause the NAND gate 88 to go logically low. This signal transition from high to low at the output of the NAND gate 88 is inverted through the inverter 90 so as to toggle the flip-flop 92 on the resulting low to high signal transition. The status signal $S_D$ occurring at the output of the toggle flip-flop 92 is hence reversed from a logically high level to a logically low level. This disables the timing circuit 38. The logically low level of the status signal $S_D$ also serves as an indication to the data source 10 that the data dispatcher 12 has successfully transmitted the previous "n" bits of information and is now ready to receive further data.

Figure 4:
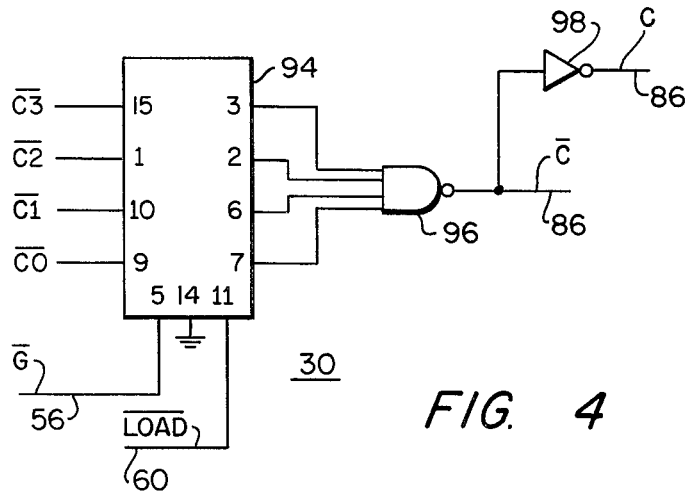
FIG. 4 is an illustration of the counter appearing in the data dispatcher of FIG. 3.
Figure 3:
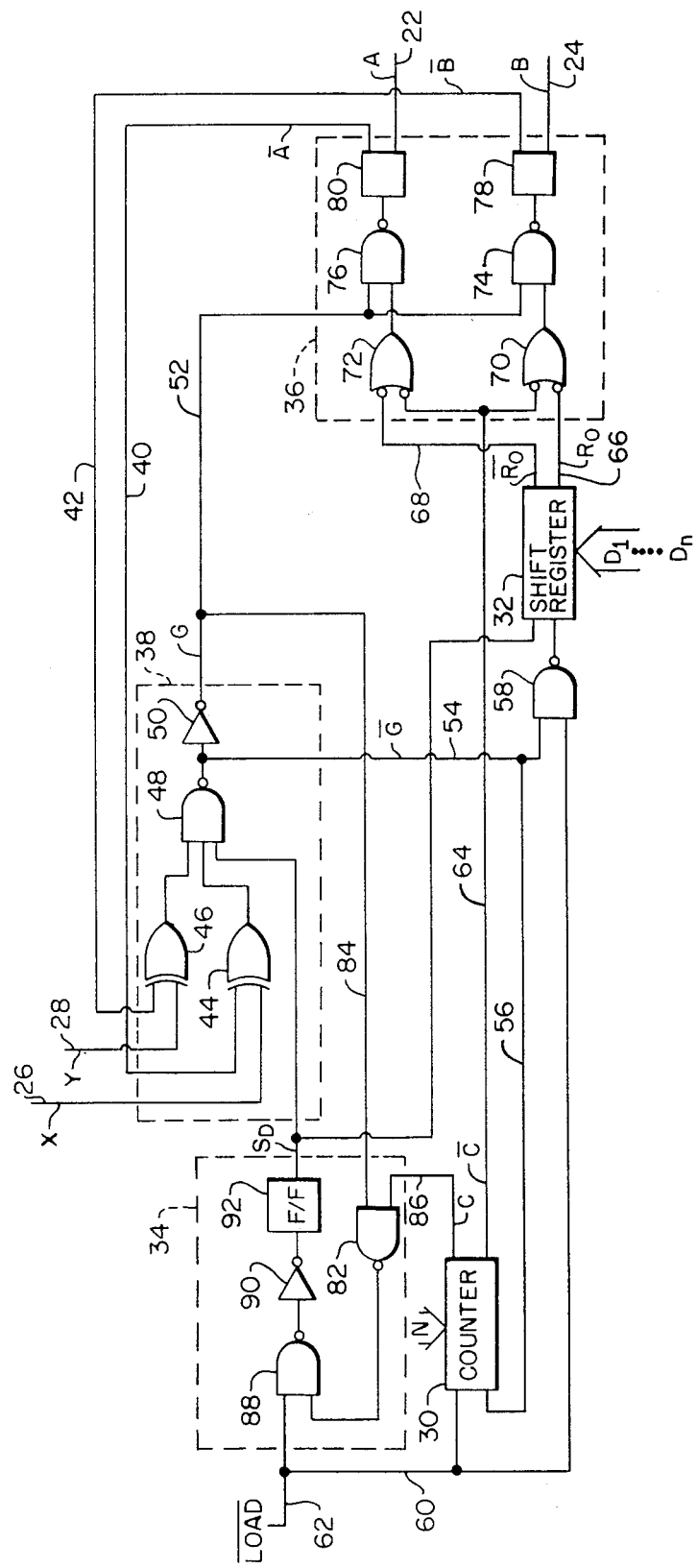
FIG. 3 is a block diagram of the data dispatcher of FIG. 2.

FIG. 4 illustrates in detail the counter 30 of FIG. 3. The counter 30 is seen to comprise a single four-bit binary counter 94 which is preferably a type 74193 Texas Instruments counter. This particular counter receives a complement count of the binary number "n" as is indicated by the input counts $\overline{C}_0$ through $\overline{C}_3$. The four-bit binary counter 94 is initially loaded by a logically low $\overline{\text{LOAD}}$ signal being applied to a pin 11. It will be remembered that the $\overline{\text{LOAD}}$ signal from the data source 10 will be logically low at such time as the data source wishes to load data. The $\overline{\text{LOAD}}$ signal subsequently goes logically high when the data source authorizes transmittal of the data.

The four-bit binary counter 94 performs a ones complement incremental count in response to the $\overline{G}$ signal which is applied to pin 5. This results in a logical high condition on each of the output pins 3, 2, 6 and 7 when the counter has thus been incrementally changed "n" times. The outputs from the counter 94 are applied to a NAND gate 96 which goes logically low upon the occurrence of all logically high output signal conditions. The output of the NAND gate 96 constitutes the signal $\overline{C}$ which is logically high when the counter 30 is changing count and logically low thereafter. The output of the NAND gate 96 is also inverted through an inverter 98 so as to produce the count signal C. The count signal C is logically low during the incremental counting and logically high when the count of "n" is reached.

Figure 5:
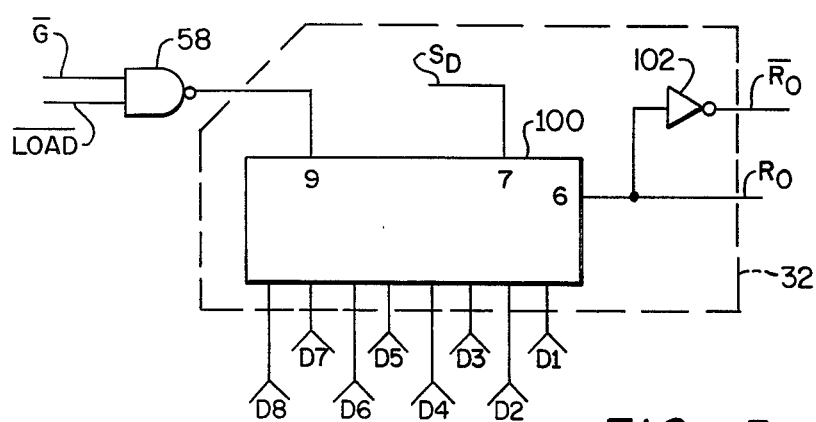
FIG. 5 is an illustration of the register appearing in the data dispatcher of FIG. 3.

The data register 32 is illustrated in detail in FIG. 5. The data register is preferably an S8274 Signetics parallel load shift register 100 which receives data bits D1 through D8. These data bits are loaded into the shift register 100 when the status signal $S_D$ applied thereto at a pin 7 is logically low and the signal from the output of the NAND gate 58 switches logically high. The status signal $S_D$ is logically low when the data dispatcher 12 is in its "not busy" condition. The signal $\overline{G}$, which is applied to the NAND gate 58, is logically high at this time. The NAND gate 58 is thus enabled by the signal $\overline{G}$ so as to respond to a low to high signal transition in the $\overline{\text{LOAD}}$ signal which is also applied to the NAND gate 58. This low to high signal transition occurs at such time as the data source 10 wishes to load the data bits. The actual parallel loading into the register 100 is extremely fast so as to precede any actual encoding and transmittal operation of the dispatcher which may occur only after the status signal $S_D$ is set high.

The shifting of the shift register 100 is accomplished when the status signal $S_D$ at pin 7 goes high and the output of the NAND gate 58 switches from high to low. This latter condition occurs when the $\overline{G}$ signal goes from a logically low to a logically high signal level. The $\overline{\text{LOAD}}$ signal is logically high during this time so as to enable the NAND gate 58 to respond to the signal transitions in the $\overline{G}$ signal. This shift register 100 provides an output signal $R_0$ at a pin 6 indicative of the binary value of the rightmost bit therein. This signal is inverted through an inverter 102 so as to indicate the negation of the rightmost bit.

Figure 6:
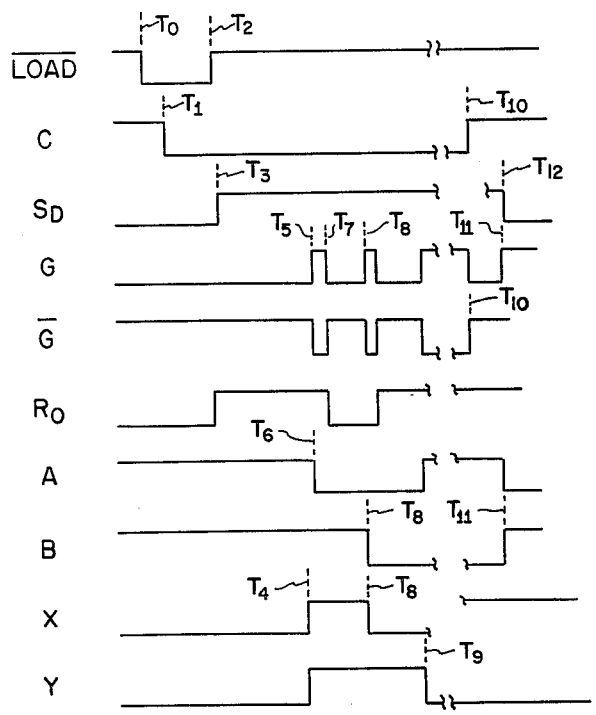
FIG. 6 is an illustration of various signals appearing in the data dispatcher of FIG. 3.

Having described the data dispatcher 12 inclusive of the counter and register therein, it is now appropriate to turn to a detailed discussion of its operation. The operation of the data dispatcher 12 is further illustrated in FIG. 6 in terms of the various signal waveforms appearing therein. The first waveform shown is that of the $\overline{\text{LOAD}}$ signal from the data source 10. The $\overline{\text{LOAD}}$ signal is initially in a logically high signal state signifying that the data source 10 does not wish to load the dispatcher. This subsequently changes at a time $T_0$ when the $\overline{\text{LOAD}}$ signal switches low so as to thereby enable the counter 30 to receive the numerical count of data bits. The count signal C subsequently goes high at a time $T_1$ indicating that the count within the counter is no longer zero. The $\overline{\text{LOAD}}$ signal goes high at a time $T_2$ when the data source wishes to load the register 32 and change the status of the dispatcher. The loading of the register 32 is indicated by the signal $R_0$ going high at time $T_2$. The status signal $S_D$ next goes logically high at a time $T_3$ indicating that the data dispatcher 12 is ready to dispatch data. The signal $R_0$ from the register 32 indicates that a binary one will be the first bit to be dispatched. The first bit will not be dispatched until such time as the data receptor 16 changes the signal states of the signals X and Y so as to thereby bring them into agreement with the signals A and B. This will of course occur only after the data receptor 16 has been released by the data sink 20. Such an event is noted to have occurred by the dispatcher at a time $T_4$. The timing circuit 38 now generates a logically high GO signal G at a time $T_5$. The data encoding circuit 36 subsequently changes the signal state of the bi-level signal A at a time $T_6$ thereby encoding a binary one. The change in signal state of the signal A creates a no-go condition for the timing circuit 38 thereby causing the GO signal G to go low at a time $T_7$. The $\overline{G}$ signal goes logically high at this time thereby shifting the register 32 so as to present a binary zero value in the signal $R_0$. The binary zero will subsequently be encoded by the data encoding circuit 36 upon the next GO condition. This will occur at a time $T_8$ when the timing circuit 38 receives a change in signal state of the signal X indicating that the data receptor 16 has received and processed the previously encoded signal change of the bi-level signal A. As can be seen, the bi-level signal B changes at the time $T_8$ reflecting the encoding of the binary zero. The signal Y will subsequently change at a time $T_9$ indicating that the data receptor 16 has received and processed the signal change in the bi-level signal B.

The aforementioned encoding operations will continue to occur until such time as the "nth" data bit has been transmitted at a time $T_{10}$. At this time, the signal $\overline{G}$ will change the count within the counter 30 so as to reflect a zero count. This will cause the count signal C to go logically high at the time $T_{10}$. The count going high at the time $T_{10}$ will be transmitted as an end of data signal at a time $T_{11}$ as is indicated by the changes in the signal states of the signals A and B. The status signal $S_D$ subsequently goes low at a time $T_{12}$ in response to the count signal C and the GO signal G being simultaneously logically high. With the status signal $S_D$ low, the data dispatcher stands ready for the next loading of data.

Having now described in detail the overall operation of the data dispatcher 12, it is now appropriate to turn to a detailed description of the data receptor 16. In this regard, the data receptor 16 is illustrated in detail in FIG. 7. It will be remembered that the data receptor 16 receives the bi-level signals A and B from the data dispatcher 12 via the lines 22 and 24. It is to be noted that there is no change in the functioning of the data receptor 16 if the communications link between the dispatcher and the receptor includes a modulated wave transmission requiring a receiver which interprets changes in four signal states so as to attach bi-level signal significance thereto. In either event, the data receptor 16 will itself receive a set of bi-level signals A and B having various signal state changes therein. It will be the function of the data receptor 16 to translate these signal state changes into data and to, in most instances, acknowledge receipt of the data by making appropriate signal state changes in the output signals X and Y which are transmitted back to the data dispatcher 12 via the lines 26 and 28 or other suitable communications link.

The specific translations of the signal state changes in the bi-level signals A and B are as follows. If A changes from zero to one or changes from one to zero and B does not change, a data one is noted and the signal state of the bi-level signal X is changed. If the signal state of the bi-level signal B changes from zero to one or from one to zero, and A does not change, a data zero is noted and the signal state of the bi-level signal Y is changed. If both bi-level signals A and B change signal states simultaneously, an end of data is noted. The data receptor 16 is thereafter operative to signal the data sink 20 that "n" bits of data have been received and that the same are available for copying. The data sink 20 in response thereto will eventually copy the data bits as well as the numerical count thereof and subsequently enable the data receptor to receive further data from the data dispatcher. The actual notification back to the data dispatcher will be in the form of changes to the bi-level signals X and Y so as to bring them into agreement with the bi-level signals A and B. Until this has occurred, the data dispatcher and data receptor will be in a locked communication condition.

The aforementioned actions by the data receptor and the data sink are the result of certain communications therebetween. In particular, the data receptor generates a status signal $S_R$ which is logically low when the data receptor has received an end of data notation. This logically low signal condition serves as the signal to the data sink 20 that the "n" bits of data have been received and are ready for copying. The signal state of the status signal $S_R$ is subsequently set equal to one when the data sink 20 wishes to release the data receptor 16 for receipt of further data from the dispatcher. This is accomplished by the data source generating the $\overline{SET}$ signal equal to one. The data source 20 also has the capability of interrupting the data communications between the data dispatcher and the data receptor. This is accomplished by a $\overline{RESET}$ signal which effectively sets the status signal $S_R$ prematurely low and freezes the receptor at whatever point that it is currently at. This effectively prohibits any further acknowledgement as to the receipt of data by the data receptor which in turn stops further transmittal of data by the dispatcher.

Figure 7:
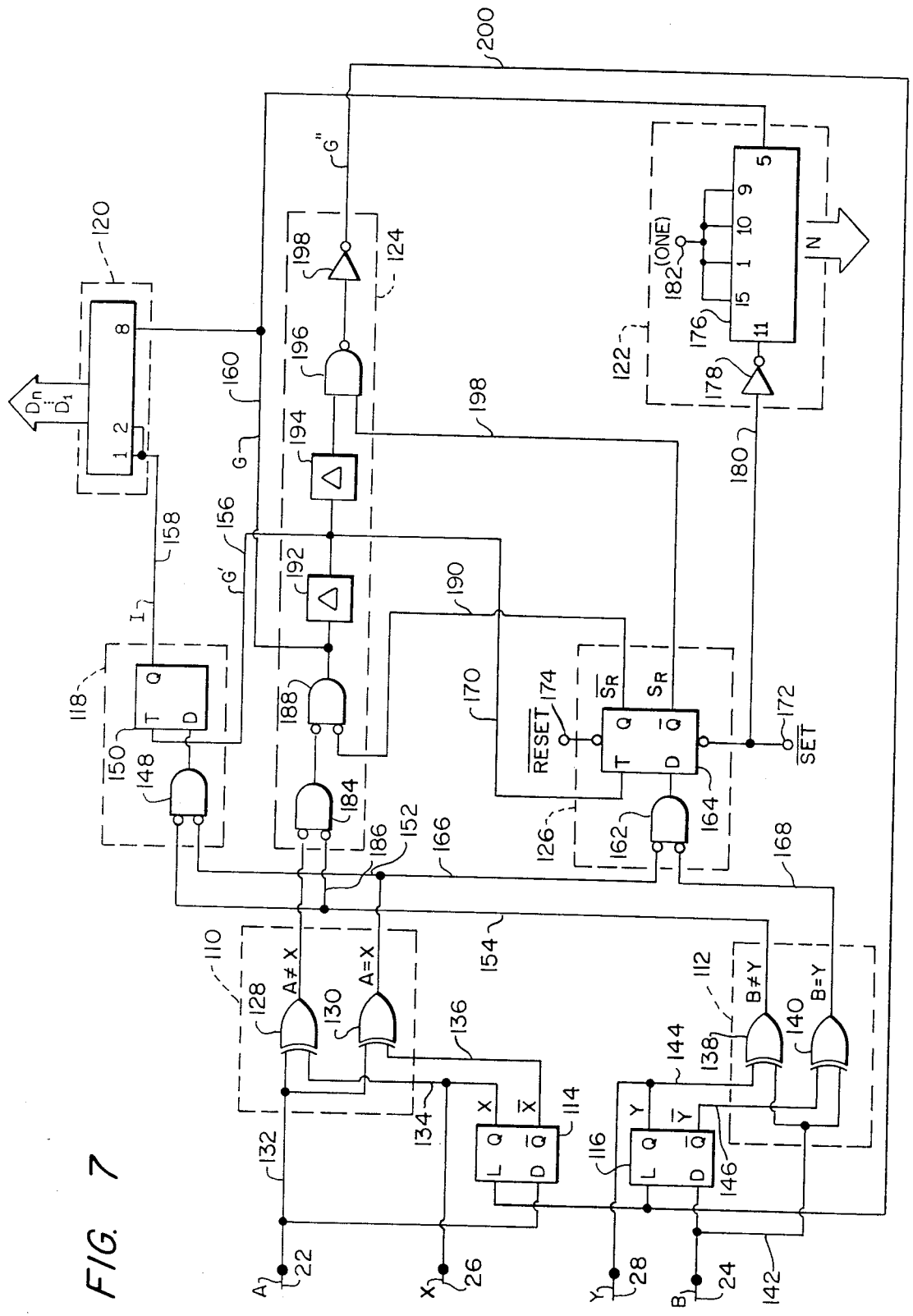
FIG. 7 is a detailed illustration of the data receptor of FIG. 2.

Turning to the detailed logic of FIG. 7, it is to be noted that the data dispatcher 16 includes nine major sections as follows: an A signal logic 110, a B signal logic 112, an X flip-flop 114, a Y flip-flop 116, a data decoding logic 118, a data register 120, a data counter 122, a timing circuit 124 and a status circuit 126. The status circuit 126 generates the status signal $S_R$. The A signal logic 110 detects changes in the signal A whereas the B signal logic detects changes in the signal B. Detected changes in the signals A and B are decoded as binary ones and zeros by the data decoding logic 118. The data decoding logic 118 generates a data integer signal I indicative of the decoded binary value. This signal I is stored as a bit within the data register 120. This bit within the shift register 120 is shifted and the count within the counter 122 is incremented by timing pulses from the timing circuit 124. The X and Y flip-flops 114 and 116 are subsequently caused to latch onto the signal states of the bi-level signals A and B. This continues to occur until an end of data is received and decoded. At this time, the status circuit 126 is operative to set the status signal $S_R$ to zero thereby suspending further operation of the data receptor 16.

Turning first to the A signal logic 110 which is comprised of a pair of EXCLUSIVE OR gates 128 and 130. EXCLUSIVE OR gate 128 receives the signal A via a line 132 and the signal X via a line 134. The output of the EXCLUSIVE OR gate 128 is indicated as $A \neq X$ and is logically high when the signals A and X are in disagreement. The EXCLUSIVE OR gate 130 receives the signal A on the line 132 as well as the signal $\overline{X}$ via a line 136. EXCLUSIVE OR gate 130 is operative to produce a logically high signal state indicating $A = X$.

The B signal logic 112 comprises a pair of EXCLUSIVE OR gates 138 and 140. The EXCLUSIVE OR gate 138 receives the B signal via a line 142 and receives the Y signal via a line 144. The EXCLUSIVE OR gate is operative to produce a logically high signal indicating a $B \neq Y$ condition. The EXCLUSIVE OR gate 140 receives the B signal via the line 142 and receives the $\overline{Y}$ signal via a line 146. The EXCLUSIVE OR gate 140 is operative to produce a logically high signal indicating $B = Y$.

It is to be noted that the A signal logic 110 receives the X and $\overline{X}$ signals from the X flip-flop 114 whereas the B signal logic 112 receives and Y and $\overline{Y}$ signals from the Y flip-flop 116. The X and Y flip-flops are of the latching type and are conditioned so as to latch onto the signal state of the respective bi-level signals A and B at a certain time dictated by the timing circuit 124. It is to be noted that such latching does not occur initially so that any change in the signal states of the bi-level signals A and B can be compared with the previous signal states of the bi-level signals A and B which were previously latched onto by the X and Y flip-flops.

Turning now to the decoding logic 118, it is seen that the logic comprises a gate 148 and a D-type edge triggered flip-flop 150. The gate 148 receives the $A = X$ signal from the A signal logic 110 via a line 152. The gate 148 also receives the $B \neq Y$ signal from the B signal logic 112 via a line 154. The gate 148 will be logically high only when both input signal conditions thereto are false. In other words, the gate 148 will be logically high only when the statement $A = X$ is false and the statement $B \neq Y$ is false. Stated another way, the output of the gate 148 will be logically high only when $A \neq X$ and $B = Y$.

The output of the gate 148 is applied to the D input of the edge triggered flip-flop 150. The output of the flip-flop 150 takes on the value of the signal applied to its D input upon the rising edge of a timing signal G' occurring on a line 156. The output of the flip-flop 150 constitutes the data integer signal I which is applied to the shift register 120 via a line 158. It is to be appreciated from the foregoing, that the data integer signal will be logically high only when the signal state of A has changed so as to not be equal to X whereas the signal state of B has not changed so as to remain equal to Y. When the reverse occurs, namely, the signal state of B changes so as to not be equal to Y while the signal state of A remains unchanged so as to equal X, then the data integer signal I will be logically low.

The binary value of the data integer signal I appearing on the line 158 is applied to a data register 120. Shifting occurs in response to a timing pulse in the signal G occurring on a line 160. The data register 120 is preferably a type 74164 which may be obtained from Texas Instruments. The output from the shift register 122 is denoted by the large arrow. The output of the shift register is read by the data sink following the conclusion of the data receiving operations.

Turning now to the status network 126 which is seen to comprise a gate 162 and a D-type edge triggered flip-flop 164. The gate 162 will be logically high when both inputs thereto are logically low. The inputs to the gate 162 are the A=X signal from the A signal logic 110 appearing on the line 166. The other input to the gate 162 is the signal B=Y signal appearing on a line 168. The output of the gate 162 will be logically high when both A=X is not true and B=Y is not true. This set of signal conditions corresponds to an end of data. The flip-flop 164 will follow the signal level applied to its D input upon the occurrence of a timing pulse in the signal G' occurring on a line 170. It is to be noted that the Q output of the flip-flop 164 is the output signal $\overline{S}_R$. The $\overline{S}_R$ signal will thus be logically high at such time as an end of data is timely noted by the status network 126. As will become apparent hereinafter, the signal $\overline{S}_R$ being equal to one or logically high does note permit the data receptor 16 to acknowledge receipt of the "end of data" which has thus been received and decoded. This effectively locks any further communication of data from the data dispatcher. In this regard, it will be remembered that transmittal of data from the dispatcher is premised on receiving an acknowledgement from the data receptor in the form of changing the signals X and Y so as to agree with the signals A and B.

The signal $S_R$ occurring at the $\overline{Q}$ output will complement the signal $\overline{S}_R$ and be logically low. This signal condition provides an indication to the data sink 20 that data from the register 120 as well as the count from the counter 122 are ready to be copied. The data sink 20 will thereafter read the count from the counter and the bits of information from the register. The data sink will next generate a logically high $\overline{SET}$ signal at a terminal 172. The logically high $\overline{SET}$ signal sets the Q output of the flip-flop 164 logically low and the $\overline{Q}$ output logically high thus causing the $\overline{S}_R$ signal to go logically low and the $S_R$ signal to go logically high. As will become apparent hereinafter, this setting of the flip-flop 164 effectively releases the data receptor 16 for further communication with the data dispatcher 12.

It is also to be noted that a $\overline{RESET}$ signal appearing at a terminal 174 is applied to the flip-flop 164. The $\overline{RESET}$ signal is an optional signal provided by the data sink 20 which effectively sets the flip-flop 164 high upon being raised to a logically high level itself. This causes the $\overline{S}_R$ signal to go logically high and the $S_R$ signal to go logically low which constitutes an end of data indication. With the signals $S_R$ and $\overline{S}_R$ thus set, the data receptor 16 will not acknowledge receipt of data from the data dispatcher 12. This in turn locks the data dispatcher 12 from transmitting any further information. It is thus to be appreciated that the data sink through the $\overline{RESET}$ signal applied to the terminal 174 can effectively lock any further communication from the data dispatcher 12.

The flip-flop 164 is preferably a type 7474 flip-flop having the appropriate set and reset capabilities which have been previously described. Such a flip-flop is available from Texas Instruments and other semiconductor manufacturers.

The counter 122 is seen to comprise a four-bit binary counter 176 which is preferably a type 74193 counter obtainable from Texas Instruments as well as other semiconductor manufacturers. This counter is loaded with a count of minus one in response to the occurrence of a logically high $\overline{SET}$ signal appearing at the terminal 172. In this regard, the $\overline{SET}$ signal is first applied to an inverter 178 via a line 180. The transition from low to high of the $\overline{SET}$ signal is inverted to a high to low transition by the inverter 178. This signal transition at the output of the inverter 178 is operative to load the count appearing on the input terminals 15, 1, 10 and 9. It is to be noted that the input terminals 15, 1, 10 and 9 are all connected to a terminal 182 having a logical one signal level thereon. This produces an initial loading of all ones into the counter 176. This all ones count is in effect a minus one count since the next count of the counter will be all zeros.

The counter 176 is operative to incrementally count from the minus one count in response to a timing signal G from the timing circuit 124. This signal is applied to a pin 5 of the counter via the line 160. The timing circuit produces a pulse on the line 160 each time a bit of data has been received. These pulses increment the count within the counter so as to maintain the count at one less than the actual number of data bits that have thus been received. This continues to occur until an "end of data" is received. At this time, the counter is again incremented so as to bring the count in the counter up to "n". This count is subsequently copied by the data sink 20 prior to the occurrence of the next $\overline{SET}$ signal which again loads a minus one count.

It is to be noted that the aforementioned operations performed by the data dispatcher 16 are dependent upon timing signals from the timing circuit 124. In this regard, the timing circuit generates three separate timing signals, G, G', and G''. The timing circuit generates these timing signals by internal logic which will be described hereinafter.

The timing circuit 124 begins with a gate 184 which is logically high when both inputs thereto are logically low. In this regard, the gate 184 receives the signal A≠X from the A signal logic 110 and the signal B≠Y from the B signal logic 112. The latter signal occurs on a line 186. The output of the gate 184 will be logically high only when both input signal conditions are false or logical zero. This means that the output of the gate 184 will only be high when A=X and B=Y. On the other hand, the output of the gate 184 will go logically low as soon as either one or both of the signals A and B change signal state so as to no longer be equal to the signal states of X and Y. The output of the gate 184 is applied to a gate 188 which also goes logically high when both input signals thereto are logically low. The gate 188 also receives the signal $\overline{S}_R$ via a line 190. It will be remembered that the $\overline{S}_R$ signal is logically low when the data receptor 16 is fully operational. This means that the gate 188 will go logically high when the data dispatcher 12 is fully operating and the output signal from the gate 184 indicates that a signal state change has taken place in either or both of the signals A and B. The output of gate 188 is the signal G which will thus go high when one of the aforementioned signal state changes has occurred. The signal G on the line 160 will cause the data register 120 to shift so as to prepare the register for receipt of the next bit of information. The signal G is also applied to the counter 122 so as to increment the count of data thus received.

The signal G is further delayed within the timing circuit 124 by a delay circuit 192. The G signal is delayed by an amount large compared to the incremental clocking time of the counter 176. This allows the count within the counter to be incremented prior to the signal G' influencing the status circuit 126. The timing signal G' appearing at the output of the delay circuit 192 is operative to trigger the flip-flop 150 within the data decoding circuit 118 as well as trigger the flip-flop 164 within the status circuit 126. The triggering of the flip-flop 150 will cause the data decoding circuit 118 to provide an appropriate signal level in the data integer signal I indicative of the bit of information which has been decoded as a result of the previously occurring signal state changes.

The signal G' is further delayed through a delay circuit 194. This delay is similar to the previous delay within the delay circuit 192. The output of the delay circuit 192 is applied to a NAND gate 196 which also receives the $S_R$ signal via a line 198. The NAND gate 196 will go low when both inputs thereto are logically high. In this regard, the status signal $S_R$ will normally be logically high unless an end of data has been previously noted or the override condition accomplished by the RESET signal has occurred. The NAND gate 196 will hence normally go logically low when the output of the delay 194 goes logically high. The signal thus occurring at the output of the delay circuit 194 is inverted through the NAND gate 196 and subsequently reinverted by an inverter 198. The output signal from the inverter 198 constitutes the signal G". This signal is applied to the X flip-flop 114 and the Y flip-flop 116 via a line 200. The X and Y outputs of the respective flip-flops 114 and 116 will follow the signal states of the respective signals A and B upon the occurrence of a logically high signal G" on the line 200. This will be transmitted back to the data dispatcher 12 so as to indicate that the data receptor 16 has received the previously transmitted unit of information. This acknowledgement by the data receptor occurs only after all other internal operations have been concluded within the data receptor 16. In this regard, all other operations are premised on earlier occurring logically high signals G and G' whereas the acknowledgement by the data receptor occurs only in response to a logically high signal G".

It is furthermore to be noted that a logically high signal G" will not occur when the status signal $S_R$ goes logically low upon the noted occurrence of an end of data by the status circuit 126. The logically low status signal $S_R$ will disable the NAND gate 196 so as to thereby maintain a logically low signal G". The NAND gate 196 will only be enabled when the status signal $S_R$ is again set high by the sink 20. This will in turn produce the logically high signal G" which will in turn latch the X and Y flip-flops 114 and 116.

Figure 8:
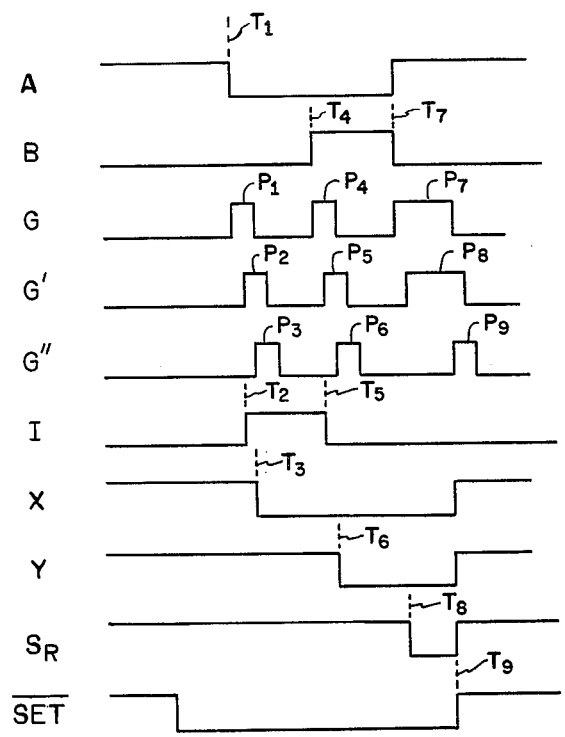
FIG. 8 is an illustration of various signals appearing in the data receptor of FIG. 7.

The above timing within the data receptor 16 is further illustrated by the signal waveforms of FIG. 8. In this regard, the waveforms A and B indicate the bi-level signals A and B as the same are received by the data receptor. The change in signal state of the bi-level signal A at time $T_1$ indicates that a data one bit has been transmitted from the data dispatcher 12. The transition of the signal B at a time $T_4$ is indicative of a binary zero having been transmitted by the data dispatcher 12. The simultaneous change of both signals A and B at time $T_7$ indicates that an end of data has occurred. The signal waveforms G, G' and G" are also illustrated in FIG. 8. The signal G produces a pulse $P_1$ in response to the change of the signal A at time $T_1$. The width of pulse $P_1$ is dependent on the amount of time that $A \neq X$. The leading edge of the pulse $P_1$ is operative to shift the data register 120. A pulse $P_2$ in the signal G' follows the pulse $P_1$ after a time delay dictated by the delay circuit 192. The leading edge of the pulse $P_2$ will trigger the data encoding circuit 118 so as to cause the data trigger signal I appearing as waveform I to go logically high indicating a binary one at a time $T_2$. This signal level is applied to the shift register 120. The signal G" will subsequently have gone high as indicated by the pulse $P_3$. The delay in the pulse $P_3$ relative to the pulse $P_2$ is primarily dictated by the delay circuit 194. The leading edge of the pulse $P_3$ will cause the signal X to change signal state at a time $T_3$. The change in the signal X will be communicated to the data dispatcher 12 indicating that the previously transmitted binary one unit of information has been received. Subsequent thereto, the change in the bi-level signal B will be received by the data receptor 16 indicating a binary zero bit of information. This will produce a pulse $P_4$ in the signal G which will shift the register 120 by one bit position. A pulse $P_5$ will next occur in the signal G' and will be operative to trigger the data encoding circuit 118 which will go logically low at a time $T_5$ indicating that a binary zero has been received. A pulse $P_6$ occurring in the signal G" will cause the signal Y to change state at a time $T_6$. This change of the signal Y will subsequently be communicated to the data dispatcher 12 so as to indicate to the dispatcher that the binary zero bit of information has been received by the data receptor. Finally, the data receptor 16 will receive changes in signal state of both the signals A and B at the time $T_7$. This will produce pulses $P_7$ and $P_8$ in the waveforms G and G'. The pulse $P_7$ in the waveform G' will trigger the status network 126 which will produce a logically low status signal $S_R$ at a time $T_8$ indicating that an end of data has been received. The status signal $S_R$ thus being logically low will suspend further internal operations of the data receptor 16.

The data receptor 16 will remain in the suspended operational condition until such time as it is released by the data sink 20. Release occurs at time $T_9$ when the data sink 20 raises the $\overline{SET}$ signal logically high. This in turn sets the status signal $S_R$ logically high. With the status signal $S_R$ set high, the signal G" goes logically high as is indicated by a pulse $P_9$. The leading edge of pulse $P_9$ will cause the X and Y flip-flops to latch onto the signal states of signals A and B. The new signal states of X and Y will be transmitted back to the data dispatcher 12 indicating that the receptor is now available for receiving further data.

It is to be appreciated that the data dispatcher 12 will itself have been in a locked condition following the transmittal of an end of data and prior to the change in the signals X and Y. In this regard, transmittal of further data by the dispatcher 12 is premised on the signals X and Y being in agreement with the signals A and B. The data sink controls when this will take place and hence controls any further transmittal of data from the dispatcher.

It is to be appreciated from the above that preferred embodiments of a data dispatcher and a data receptor have been disclosed. In this regard, it is to be understood that various modifications and alterations may be made to the data receptor and data dispatcher 12 without departing from the scope of the invention.

What is claimed is:

1. A system for serially transferring information in a clockwise fashion wherein each unit of information is one of three discrete units of information, said system comprising:
    means for transmitting first and second bi-level signals having encoded signal changes between the signal levels therein whereby any change in signal level of only the first bi-level signal constitutes a first discrete unit of information, any change in signal level of only the second bi-level signal constitutes a second discrete unit of information and any change in signal level of both bi-level signals constitutes a third discrete unit of information;
    means for receiving the first and second bi-level signals, said receiving means comprising:
        means for detecting signal changes in the first and second bi-level signals, and
        means, responsive to the detected signal changes in the first and second bi-level signals, for producing signal changes in third and fourth bi-level signals; and
    means for feeding back the third and fourth bi-level signals to said transmitting means.

2. The system of claim 1 wherein the signal changes in the third and fourth bi-level signals produce signal levels in the third and fourth bi-level signals which logically agree with the signal levels in the first and second bi-level signals.

3. The system of claim 1 wherein said means for transmitting the first and second bi-level signals comprises:
    means for comparing the signal levels of the first and second bi-level signals with the signal levels of the third and fourth bi-level signals.

4. The system of claim 3 wherein said means for transmitting the first and second bi-level signals further comprises:
    means, coupled to said comparing means, for encoding a discrete unit of information when the signal levels of the first and second bi-level signals logically agree with the signal levels of the third and fourth bi-level signals.

5. The system of claim 4 wherein said receiving means further comprises:
    means, responsive to the detected signal changes, for decoding each detected signal change as one of the discrete units of information.

6. The system of claim 5 wherein said receiving means further comprises:
    timing means for enabling said decoding means and said means for producing signal changes in the third and fourth bi-level signals, said timing means being operative to first enable said decoding means and thereafter enable said means for producing signal changes in the third and fourth bi-level signals.

7. The system of claim 6 wherein said means for producing signal changes in the third and fourth bi-level signals comprises:
    a pair of bistable means for producing said third and fourth bi-level signals, said pair of bistable means being operative to follow the signal levels of the first and second bi-level signals when enabled by said timing means.

8. The system of claim 6 wherein said receiving means further comprises:
    means, responsive to signal changes in both the first and second bi-level signals, for disabling said timing means.

9. The system of claim 8 wherein said receiving means further comprises:
    means, responsive to said timing means, for incrementing a count of the number of units of information decoded by said decoding means.

10. The system of claim 9 wherein said disabling means is operative to disable said timing means after said count of the number of units of information has been incremented.

11. The system of claim 10 wherein said disabling means is operative to produce a status signal indicative of an end of transmittal of information.

12. The system of claim 11 further comprising:
    means, responsive to the status signal, for copying the transmitted information, said copying means being operative to reset said disabling means so as to again enable said means for producing signal changes in the third and fourth bi-level signals whereby the signal levels of both the third and fourth bi-level signals are changed so as to agree with the signal levels of the first and second bi-level signals.

13. The system of claim 5 wherein said receiving means further comprises:
    means, responsive to signal changes of both the first and second bi-level signals, for disabling said means for producing signal changes in the third and fourth bi-level signals.

14. The system of claim 13 wherein said disabling means is operative to produce a status signal indicative of an end of transmittal of information.

15. The system of claim 14 further comprising:
    means, responsive to the status signal, for copying the transmitted information, said copying means being operative to reset said disabling means so as to again enable said means for producing signal changes in the third and fourth bi-level signals whereby the signal levels of both the third and fourth bi-level signals are changed so as to agree with the signal levels of the first and second bi-level signals.

16. The system of claim 1 wherein the third discrete unit of information constitutes an indication as to an end of transmission of data and wherein said receiving means further comprises:
    means for detecting signal changes in the first and second bi-level signals constituting the third discrete unit of information; and
    means, responsive to the detection of the third discrete unit of information, for disabling said means for producing signal changes in the third and fourth bi-level signals.

17. The system of claim 16 wherein said disabling means is operative to produce a status signal indicative of an end of transmittal of information.

18. The system of claim 17 further comprising:
means, responsive to the status signal, for copying the transmitted information, said copying means being operative to reset said disabling means so as to again enable said means for producing signal changes in the third and fourth bi-level signals whereby the signal levels of both the third and fourth bi-level signals are changed so as to agree with the signal levels of the first and second bi-level signals.

19. The system of claim 18 wherein said disabling means is operative to prematurely disable said means for changing the third and fourth bi-level signals in response to a signal from said copying means.

20. A system for serially transferring bits of information in a clockwise manner, said system comprising:
means for transmitting each bit of information as at least one change in signal state from among four signal states;
means for receiving each change in signal state from among the four signal states, said receiving means comprising:
means for translating each change in signal state into a bit of information, and
means for producing at least one change in signal state from among a second set of four signal states; and
means for feeding back each change in signal state from among the second set of four signal states to said transmitting means.

21. The system of claim 20 wherein said means for transmitting each bit of information comprises:
means for comparing the fed back changes in signal state with the transmitted changes in signal state.

22. The system of claim 21 wherein said means for transmitting each bit of information further comprises:
means, coupled to said comparing means, for encoding a bit of information when the fed back changes in signal state logically agree with the previously transmitted changes in signal state.

23. The system of claim 22 further comprising:
counting means for maintaining a count of the bits of information to be transferred, said counting means being operative to produce a signal indicative of the count reaching zero; and
means responsive to the count reaching zero for transmitting at least two signal state changes from among four signal states.

24. The system of claim 23 wherein said receiving means further comprises:
means, responsive to the two transmitted signal state changes, for disabling said means for producing at least one change in signal state from among a second set of signal states.

25. The system of claim 24 wherein said disabling means is operative to produce a status signal indicative of an end of transmittal of information.

26. The system of claim 25 further comprising:
means, responsive to the status signal, for copying the transmitted information, said copying means being operative to reset said disabling means so as to again enable said means for producing at least one change in signal state from among a second set of four signal states whereby at least two signal state changes occur.

27. A method for serially transferring bits of information in a clockles manner, said method comprising the steps of:
transmitting each bit of information as at least one change in signal state from among four signal states;
receiving each change in signal state from among the four signal states;
translating each change in signal state into a bit of information;
producing at least one change in signal state from among a second set of four signal states;
comparing each change in signal state from among the second set of four signal states with the previously transmitted changes in signal state from among four signal states; and
repeating the above steps when said comparing step indicates that the changes in signal states of the second set of four signal states logically agree with the originally transmitted changes in signal state.

28. The method of claim 27 further comprising the steps of:
maintaining a count of the bits of information to be transferred; and
transmitting at least two signal state changes from among the four signal states when the count of bits of information to be transferred reaches zero.

29. The method of claim 28 further comprising the step of:
preventing said step of producing at least one change in signal state from among a second set of four signal states when the two transmitted signal state changes are received.

30. The method of claim 29 further comprising the steps of:
copying the transmitted bits of information; and
authorizing at least two changes in signal state from among the second set of four signal states.

* * * * *